United States Patent
Gogolev et al.

(10) Patent No.: US 12,395,376 B2
(45) Date of Patent: Aug. 19, 2025

(54) TRANSPORTING A MESSAGE FROM AN INDUSTRIAL END DEVICE OVER AN ETHERNET NETWORK

(71) Applicant: ABB Schweiz AG, Baden (CH)

(72) Inventors: Alexander Gogolev, Dachau (DE); Johan Åkerberg, Västerås (SE); Jörgen Bror Gade, Västerås (SE); Mallikarjun Kande, Solon, OH (US)

(73) Assignee: ABB Schweiz AG, Baden (CH)

( * ) Notice: Subject to any disclaimer, the term of this patent is extended or adjusted under 35 U.S.C. 154(b) by 286 days.

(21) Appl. No.: 17/941,147

(22) Filed: Sep. 9, 2022

(65) Prior Publication Data

US 2023/0069976 A1    Mar. 9, 2023

Related U.S. Application Data

(63) Continuation of application No. PCT/EP2021/055794, filed on Mar. 8, 2021.

(30) Foreign Application Priority Data

Mar. 11, 2020   (EP) ..................................... 20162481

(51) Int. Cl.
*G06F 15/173*   (2006.01)
*H04L 12/413*   (2006.01)
(Continued)

(52) U.S. Cl.
CPC ............ *H04L 12/413* (2013.01); *H04L 47/24* (2013.01); *H04L 47/28* (2013.01); *H04L 67/12* (2013.01)

(58) Field of Classification Search
CPC ................................ H04L 47/24; H04L 67/12
See application file for complete search history.

(56) References Cited

U.S. PATENT DOCUMENTS 10,044,524 B1    8/2018  Edelhaus et al.
2003/0185201 A1  10/2003  Dorgan
(Continued)

FOREIGN PATENT DOCUMENTS

CN   109691038 A    4/2019
EP    2805441 B1   10/2017
(Continued)

OTHER PUBLICATIONS

The Patent Office of the People's Republic of China, Office Action in Chinese Patent Application No. 202180020557.X, 7 pp. (Jan. 4, 2024).
(Continued)

*Primary Examiner* — Padma Mundur
(74) *Attorney, Agent, or Firm* — Leydig, Voit & Mayer, Ltd.

(57) ABSTRACT

A method for transporting a message from an end device in an industrial plant over an Ethernet network with extended functionality for time-sensitive communication includes obtaining the message from a control application of the end device, mapping the message, based at least in part on the
(Continued)

content of the message, to at least one functionality for time-sensitive communication converting the message into Ethernet frames; encoding a request to transport the message; transmitting the Ethernet frames; decoding the request; and forwarding the message on the Ethernet network according to the requested functionality for time-sensitive communication.

11 Claims, 2 Drawing Sheets

(51) Int. Cl.
  *H04L 47/24* (2022.01)
  *H04L 47/28* (2022.01)
  *H04L 67/12* (2022.01)

(56) References Cited

U.S. PATENT DOCUMENTS

| | | |
|---|---|---|
| 2012/0191805 A1 | 7/2012 | Fee et al. |
| 2018/0160424 A1 | 6/2018 | Cavalcanti et al. |
| 2018/0248980 A1 | 8/2018 | Götz et al. |
| 2019/0132150 A1 | 5/2019 | Ramachandran et al. |
| 2019/0268267 A1 | 8/2019 | Pignataro et al. |
| 2019/0322298 A1* | 10/2019 | Mong .................. B61L 23/005 |
| 2021/0075838 A1* | 3/2021 | Kießling ................ H04L 67/12 |
| 2022/0045962 A1* | 2/2022 | Roeland ............... H04L 43/087 |

FOREIGN PATENT DOCUMENTS

| | | |
|---|---|---|
| WO | WO 2017/092879 A1 | 6/2017 |
| WO | WO 2017/093014 A1 | 6/2017 |
| WO | WO 2020/165857 A1 | 8/2020 |
| WO | WO 2021/013338 A1 | 1/2021 |

OTHER PUBLICATIONS

Gogolev et al., "TSN-Enabled OPC UA in Field Devices," *2018 IEEE 23rd International Conference on Emerging Technologies and Factory Automation (ETFA)*, vol. 1, IEEE, 297-303 (Sep. 4-7, 2018).

Gogolev et al., "TSN Traffic Shaping for OPC UA Field Devices," *2019 IEEE 17th International Conference on Industrial Informatics (INDIN)*, vol. 1, IEEE, 951-956 (Jul. 22-25, 2019).

European Patent Office, International Search Report in International Patent Application No. PCT/EP2021/055794, 3 pp. (Jun. 1, 2021).

European Patent Office, Written Opinion in International Patent Application No. PCT/EP2021/055794, 6 pp. (Jun. 1, 2021).

Shrestha et al., "Precise Clock Synchronization in High Performance Wireless Communication for Time Sensitive Networking," *IEEE Access*, 6: 8944-8953 (Feb. 12, 2018).

Xu et al., "Multiple Link Optimal Transmission Technology Based on Network Coding," *J. Command Information System and Technology*, 11(1): 5 pp. (Feb. 2020).

Zhang, "Research on Scheduling and Forwarding Mechanism in Time-Sensitive Networking," *Dissertation, Computer Science and Technology, Tsinghua University*, 158 pp. (Jun. 2021).

The Patent Office of People's Republic of China, Office Action in Chinese Patent Application No. 202180020557.X, 8 pp. (Jun. 29, 2023).

* cited by examiner

TRANSPORTING A MESSAGE FROM AN INDUSTRIAL END DEVICE OVER AN ETHERNET NETWORK

CROSS-REFERENCE TO RELATED APPLICATIONS

This patent application claims priority to International Patent Application No. PCT/EP2021/055794, filed on Mar. 8, 2021, which claims priority to European Patent Application No. 20162481.4, filed on Mar. 11, 2020, each of which is incorporated herein in its entirety by reference.

FIELD OF THE DISCLOSURE

The present disclosure relates to the communication of time-sensitive messages from, to and between end devices in an industrial plant over an Ethernet network.

BACKGROUND OF THE INVENTION

Industrial plants are increasingly fitted with Ethernet networks that are enhanced with extended functionality for time-sensitive communication. Many "Industry 4.0" concepts assume that communication over Ethernet with Time-Sensitive Network, TSN, functionality, in combination with Open Platform Communications Unified Architecture, OPC UA, will fully replace various control applications and fieldbuses. EP 2 805 441 B1 discloses a method for configuring transmission of data over a packet switched data network between time-synchronized communication modules.

The useful service life of industrial end devices is typically much longer than the innovation cycle regarding the network communication. Some field devices may be in use for decades. An industrial plant network built on OPC UA and TSN-enhanced Ethernet will therefore likely have to cope with end devices that are not TSN-aware for a foreseeable future.

BRIEF SUMMARY OF THE INVENTION

In one general aspect, the present disclosure provides systems and methods that enhance the participation of end devices that are not aware of extended functionality for time-sensitive communication in an Ethernet network that employs such functionality.

In one embodiment, the systems and methods in accordance with the disclosure operate to transport a message from an end device in an industrial plant over an Ethernet network with extended functionality for time-sensitive communication.

The disclosure describes a method for transporting a message from an end device in an industrial plant over an Ethernet network with extended functionality for time-sensitive communication. In particular, this functionality for time-sensitive communication may be Time-Sensitive Networking, TSN, functionality. TSN functionality is in the process of being standardized by the IEEE Time-Sensitive Networking Task Group. However, any other functionality for time-sensitive communication may be used as well in the context of the invention.

In the course of the method, an enabler component of the end device obtains the to-be-transported message from a control application of the end device. The enabler component may specifically comprise a software component running on the same hardware platform as the control application of the end device. Any suitable method provided by the hardware platform, and/or by an operating system on top of which the control application and the enabler run, may then be used to convey the message from the control application to the enabler component. Alternatively or in combination, the enabler component may comprise a hardware component. For example, such a hardware-component may be "piggy-backed" onto the end device and receive the message via a fieldbus interface or other interface that the end device was originally designed to use in order to exchange messages.

The enabler component maps the message to at least one functionality for time-sensitive communication that is to be used when transporting the message over the Ethernet network. That is, the enabler component is aware of the functionality that is available in the Ethernet network where the end device resides, and selects the functionality that is to be used for the concrete message. In particular, such functionality may comprise increasing the priority of particular messages over other traffic in the Ethernet network, or even transmitting a particular message with a guarantee that it will reach its recipient within a predetermined time.

This selection (i.e., the mapping) is based at least in part on the content of the message, and/or on a path through which the message is delivered to the enabler component. In particular, if the enabler component is to be used together with an existing control application, it is advantageous to analyze the content of the message and determine the to-be-used functionality for time-sensitive communication based on the result of this analysis. If there is the option of upgrading the control application in the course of making the end device as a whole aware of the functionality for time-sensitive communication, then this may be facilitated by providing different paths on which the control application may be transmitted to the enabler component. Specifically, by choosing a particular path, the control application may indicate a priority of the message to the enabler component. Figuratively speaking, the enabler component may provide differently colored in-trays for messages from the control application, and treat messages differently according to which in-tray they are put in.

The enabler component converts the message into one or more Ethernet frames. If the original message is already in the form of an Ethernet frame, this may comprise copying the original Ethernet frame and modifying this as needed. If the original message is in a non-Ethernet format, a new Ethernet frame may be created.

The enabler component encodes a request to transport the message according to at least one functionality for time-sensitive communication in at least one of said one more Ethernet frames and transmits the one or more Ethernet frames onto the Ethernet network. At least one network device of the Ethernet network decodes the request and forwards the message on the Ethernet network according to the requested functionality for time-sensitive communication. In particular, the network device may be a switch, a router, or a bridge.

Thus, the overall task of exploiting the new functionality for time-sensitive communication when transporting messages from an end device that was previously not aware of this functionality is shared between the enabler component and the network device. In particular, the encoding of the request by the enabler component and the converting of the decoded request into a concrete action introduce a layer of abstraction that avoids, to a large extent, having to change the enabler component in response to changes to the Ethernet network and its functionality for time-sensitive communication. In a particular industrial plant, there are many more end devices than there are network devices, so leaving the enabler components on these end devices untouched when changes are made to the network saves a lot of work.

BRIEF DESCRIPTION OF THE SEVERAL VIEWS OF THE DRAWING(S)

DETAILED DESCRIPTION OF THE INVENTION

Figure 1:
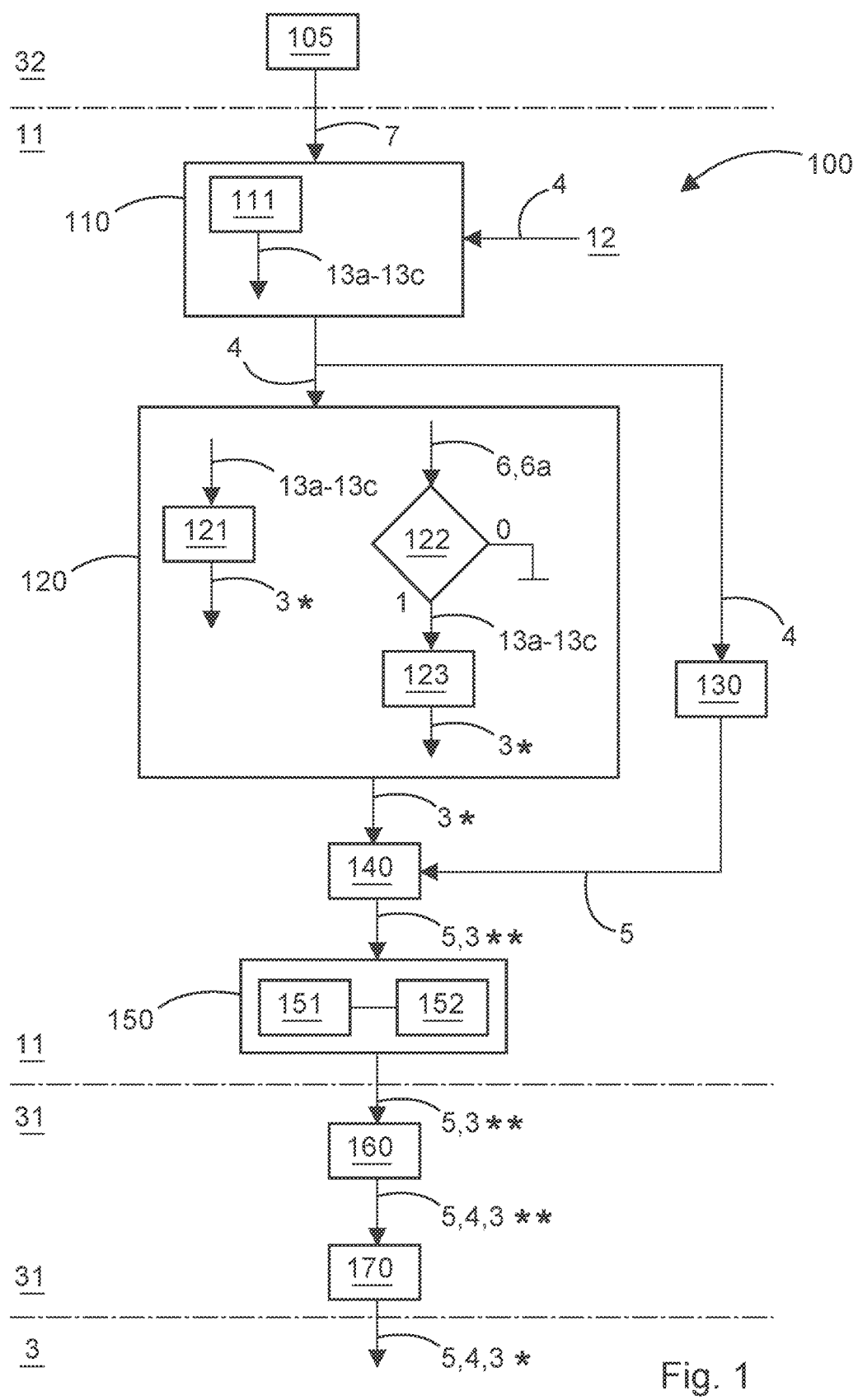
FIG. 1 is a flow chart of an exemplary embodiment for a method in accordance with the disclosure.

FIG. 1 is a schematic flow chart of an exemplary embodiment of the method 100. In step 105, the enabler module 11 may be provisioned with configuration information 7 from a server 32 somewhere on the Ethernet network 3 in the industrial plant 2 (not shown in FIG. 1).

In step 110, the enabler component 11 obtains the message 4 from a control application 12. Optionally, according to block 111, this may comprise providing multiple virtual interfaces 13a-13c to the control application 12.

In step 120, the message 4 is mapped to at least functionality 3* for time-sensitive communication that is to be used when transporting the message 4 over the Ethernet network 3. Inside box 120, two exemplary manners are shown how this mapping may be performed.

According to block 121, the mapping may be performed according to the virtual interface 13a-13c that has received the message 4.

According to block 122, it may be determined whether the message 4 matches the condition 6a of a rule 6 in a set of rules 6 in the enabler module 11. If this is the case (truth value 1), according to block 123, the functionality 3* specified in the rule 6 may be chosen as the functionality 3* to use.

In step 130, the message 4 is converted into one or more Ethernet frames 5. In step 140, the enabler component encodes a request 3** to transport the message 4 according to functionality 3* for time-sensitive communication in one or more of the Ethernet frames 5. For this purpose, the Ethernet frames 5 may be modified and/or augmented.

The Ethernet frames 5 are transmitted onto the Ethernet network 3 in step 150. Optionally, according to block 151, a system time of the enabler component 11 may be synchronized with the Ethernet network 3, so that the Ethernet frames 5 may be transmitted according to a predetermined schedule received from the network device 31.

The network device 31 is the first entity on the Ethernet network 3 that processes the Ethernet frames 5. In step 160, the request 3** is decoded, and so the network device 31 learns which functionality 3* for time-sensitive communication shall be used when forwarding the message 4 further onto the Ethernet network 3. This forwarding is performed in step 170.

Figure 2:
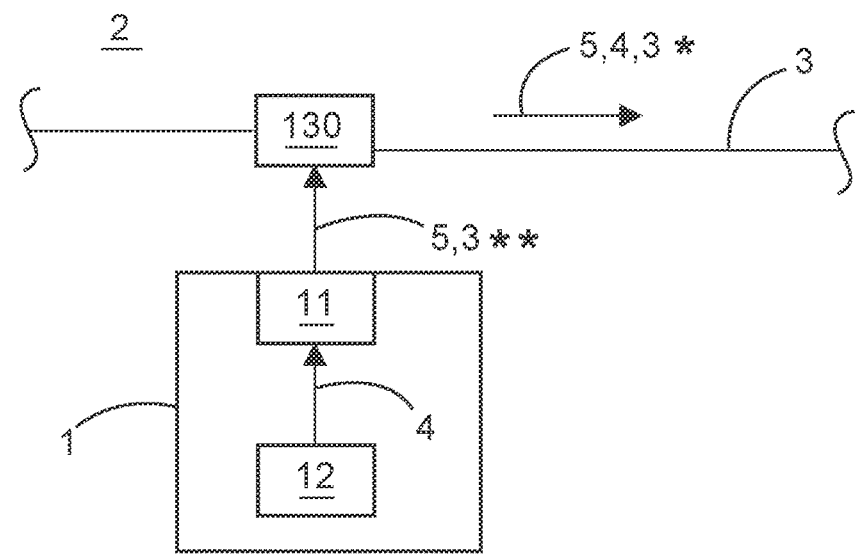
FIG. 2 is a block diagram for an industrial plant having an end device and comprising an enabler component in accordance with the disclosure.

FIG. 2 shows an exemplary end device 1 in an industrial plant 2 that is covered by an Ethernet network 3. The Ethernet network 3 is drawn in bus topology only for simplicity; in reality, the Ethernet network 3 is a switched network.

The end device 1 comprises a control application 12 that is not aware of any functionality 3* for time-sensitive communication in the Ethernet network 3. The control application 12 sends a message 4 that is meant for a destination on the Ethernet network 3 to the enabler component 11. As discussed in connection with FIG. 1, the enabler component 11 produces a request 3** to user certain functionality 3* for time-sensitive communication. This request 3** is decoded by the network device 31, and the message 4, which had been passed to the network device 31 in Ethernet frames 5, is passed on to its destination somewhere else on the Ethernet network 5, using the functionality 3*.

Figure 3:
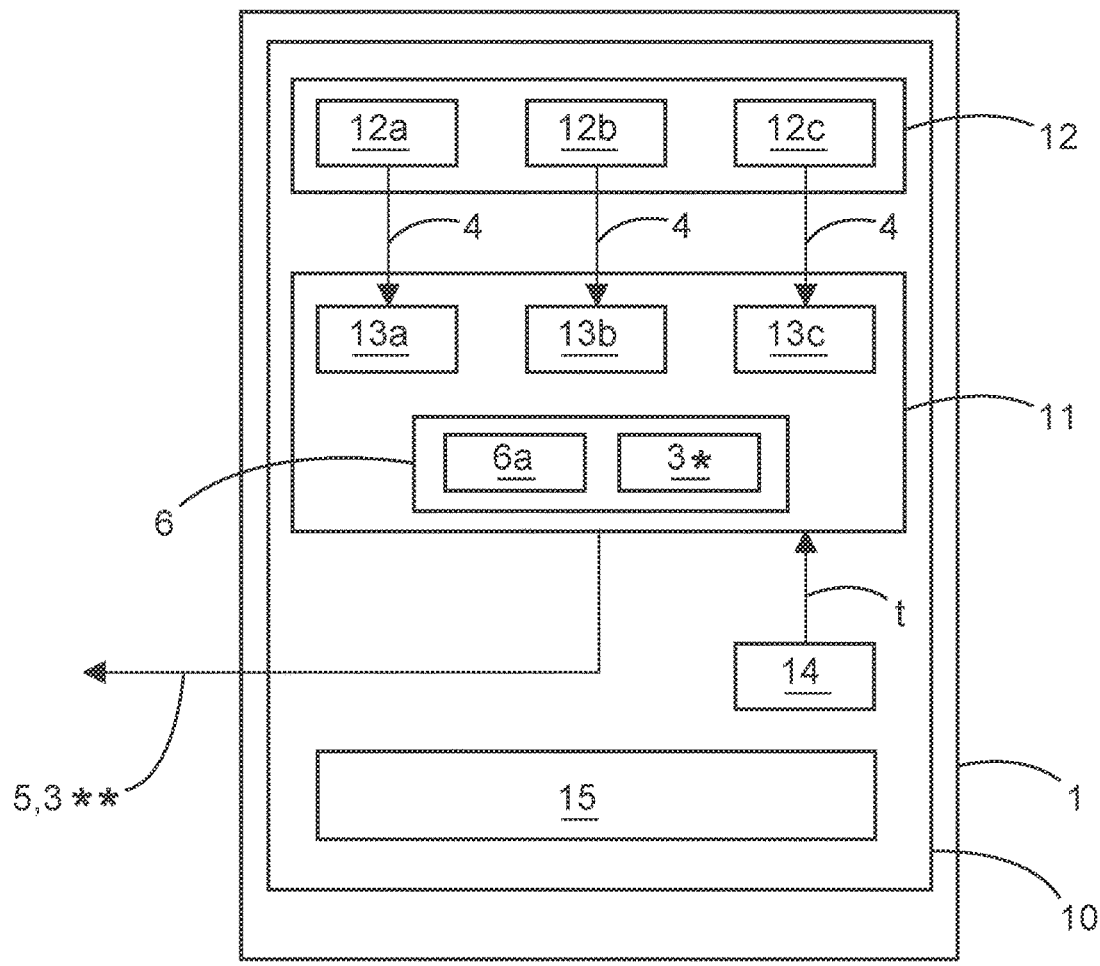
FIG. 3 is a schematic of an end device having multiple control applications and corresponding virtual interfaces in an enabler component in accordance with the disclosure.

FIG. 3 shows an exemplary end device 1 in more detail. The end device 1 comprises a hardware platform 10. On top of this platform 10, an operating system kernel 15 runs. On top of the kernel 15, the control application 12 and the enabler component 11 run. The enabler component is further supplied with a notion of the current system time t by hardware clock 14 of the hardware platform 10.

In the example shown in FIG. 3, the control application 12 has three different modules 12a-12c. To each such module 12a-12c, the enabler component 11 provides a separate corresponding virtual interface 13a-13c. The request 3** to use functionality 3* for time-sensitive communication relates to different functionality 3* depending on which of the virtual interfaces 13a-13c received the message 4. That is, the message 4 may be determined to be of higher or lower priority depending on its source in the control application 12.

Furthermore, within enabler module 11, rules 6 for the treatment of messages 4 are defined. Each such rule defines at least one condition 6a and a corresponding functionality 3* for time-sensitive communication. If the condition 6a is met, the functionality 3* shall be requested in the request 3*.

For example, when carrying out the method in accordance with the disclosure, at a first point in time, only one physical path may be available between a network device that serves a particular end device and a destination that is to receive a message from this end device within a particular guaranteed time frame. To guarantee timely delivery, the network device has no choice but to defer the forwarding of lower-priority traffic. At a later point in time, a second physical line is installed, and there is the new option of using this second physical line for speedy delivery of the message. The enabler component still only needs to request the "what", i.e., the timely delivery. The network device takes care of the new "how", i.e., which line to use and what else to do to guarantee timely delivery.

In an advantageous embodiment, the request is encoded in a priority class (such as a Quality of Service, QoS, field), and/or in a stream identification parameter, of at least one Ethernet frame. For example, if the enabler component provides different paths ("in-trays") for messages to the control application, then it may assign a different stream identification parameter to the message depending on the path that the control application chooses to convey the message. When messages marked with different stream identification parameters are received by the network device, the network device may take appropriate action when forwarding them.

Again, the sharing of the work between the enabler component and the network device is advantageous if the concrete handling of the messages is to be changed on a large scale. For example, if there is a quality problem in a final product, this may arouse the suspicion that a chemical production process did not exactly follow its intended temporal recipe because certain actions (such as opening or closing valves) took too long to initiate over the Ethernet network. It may then become necessary to accelerate the transporting of all messages relating to such actions at the cost of the transporting of other messages. If the to-be-accelerated messages can be distinguished from the less important messages by their stream identifiers, then the change may be easily implemented by mapping these stream identifiers to different actions in the network devices. The enabler components in the end devices (such as controllers and valves) may remain untouched.

For example, if the enabler component allows to produce traffic that is mapped to a particular QoS class using the VLAN tag and its priority field, the network device in a TSN-enabled network may recognize this traffic and guarantee timely transport through the network, with limits to upper boundaries of latency and jitter. In this context, "through the network" means "between the first entry bridge port and the last exit bridge port". Early evaluations suggest that such a scenario can ensure millisecond latencies that suffice for most process automation requirements. An end device equipped in this manner by means of the enabler component may be considered as "TSN-ready".

In a particularly advantageous embodiment, the obtaining the message from the control application of the end device specifically comprises providing, by the enabler component, to the control application, a plurality of virtual interfaces that are configured to receive the message from the control application. The message may then be mapped to the at least one functionality for time-sensitive communication based at least in part on the virtual interface that has received the message. Thus, the virtual interfaces correspond to the "differently colored in-trays" discussed before. If the control application is to be upgraded to avail itself of the new functionality for time-sensitive communication, this can be easily accomplished by having the control application send the message to the enabler component via a different virtual interface. In particular, at least one virtual interface may specifically be a virtual Ethernet interface, a UNIX socket, a UNIX named pipe, a FIFO, a UNIX character device, or a UNIX block device. For example, in UNIX, a physical network interface that was previously used to transmit all messages is easily augmented with a plurality of virtual network interfaces that represent, e.g., different priorities of messages.

In a further particularly advantageous embodiment, the mapping of the message to the at least one functionality for time-sensitive communication based on the content of the message is based on a predetermined set of rules in the enabler component. Each rule in this set of rules contains at least a condition that relates to the content of the message and associated the fulfilling of this condition with a concrete functionality for time-sensitive communication that shall be used when transporting the message over the Ethernet network. Thus, for at least one rule, it is checked whether the condition required by this rule is met, and if the condition is met, the functionality for time-sensitive communication specified by this rule is selected as a functionality to use.

These rules are rather specific to concrete end devices and the types of messages that can come from these end devices. It is therefore advantageous to administer them on the end devices, rather than on the network devices of the Ethernet network.

For example, at least one condition required by at least one rule may specifically comprise that the end device indicates, by virtue of the message, an abnormality it has detected. Specifically, the end device may indicate in this manner that it is in an abnormal state. For example, if a heating element does not complete an electric circuit with a power source despite being connected to the power source, this may indicate that the heating element is broken and there is no conductive path through it.

The end device may also indicate that a physical action performed by the end device on an industrial process executed by the industrial plant has failed. For example, after a valve has been instructed to open or close and has actuated its drive mechanism to move the valve member accordingly, it may be checked with a proximity sensor whether the valve member has actually reached the intended position or whether it is stuck.

Alternatively or in combination, at least one condition required by at least one rule may comprise that a measurement value of a physical quantity comprised in the message falls above or below a predetermined threshold value set in the at least one rule.

The rationale behind this is that many sensors are present in an industrial plant for the purpose of detecting abnormal conditions. As long as there is no abnormality, there is no urgent need to follow, say, a temperature value that is bobbing up and down between 30° C. and 32° C. In a typical industrial plant, there will be a large flood of such non-urgent, normal measurement values. But when a sudden departure of a measurement value from the normal state indicated a problem, immediate action may be required. For example, if said temperature suddenly breaks out of the 30° C. to 32° C. band and shoots up to 40° C., this may indicate that a cooling fan has stopped working, and a device has to be shut off immediately in order to avoid overheating.

In another example, the concrete current value that a valve motor draws while actuating the valve is not interesting most of the time. But if the current is lower than a certain threshold, then this may indicate that the mechanical connection between the motor and the valve member is broken, so that the motor does not act upon the valve member any more. If the current is higher than a certain threshold, this may indicate that the movement of the valve member is impeded by an unusually high resistance, so that the valve member may be close to getting stuck altogether.

In a further embodiment, the method further comprises synchronizing a system time of the enabler component with the Ethernet network. If such a synchronization has been achieved by the enabler component, then the one or more Ethernet frames may be transmitted from the enabler component to the Ethernet network, and thus to the network device, more efficiently. For example, a notion of the exact time on the side of the enabler component allows the enabler component to transmit the one or more Ethernet frames according to a schedule received by the enabler component from the at least one network device. If the end device is able to produce traffic that has a specific QoS mapping and is transmitted at a scheduled time, this may guarantee □s-granular precision in data transport between any two end devices. The end device may then be deemed to have "full TSN support".

There are three main types of industrial end devices for which it is particularly advantageous to make them aware of the extended functionality for time-sensitive communication.

As discussed above, an end device may specifically comprise a sensor that is configured to measure at least one physical property. This physical property is relevant for an industrial process executed by the industrial plant, be it because it is a state variable of the process itself, or because it indicated the working state of equipment that is executing the industrial process.

As discussed above, the end device may comprise an actuator that is configured to perform a physical action on the industrial process.

The end device may also comprise a controller that is configured to drive one or more actuators and receive measurement values from at least one sensor, so as to cause at least one quantity indicated by the measurement values to move to, and/or to remain at, a predetermined setpoint value. For example, a controller may actuate inflow and outflow valves of a reaction vessel, so as to keep a pressure or temperature within the vessel at the setpoint value. Even in a normal operating situation, messages sent by the controller to one or more actuators may be urgent. For example, the maximum slew rate with which the controller may change the temperature or pressure in the vessel may depend on how fast the controller can open or close particular valves.

As discussed before, the final handling of the message with respect to the extended functionality for time-sensitive communication is determined by a cooperation between the enabler component on the one hand, and a network device on the other hand. Some coordination between those two entities is therefore needed. The enabler component may be configured up-front to cooperate with a particular network device when it is installed. But it is very advantageous if changes to the configuration of the enabler component at run-time are possible. For example, a threshold value beyond which a measurement value will cause a message to get a higher priority may need to be adjusted. Also, the implementation of new functionality for time-sensitive communication in the Ethernet network may prompt a corresponding augmentation of enabler components, so that the new functionality will actually be utilized to a better extent.

Therefore, in a specially advantageous embodiment, the enabler component receives configuration from at least one server. This configuration information is indicative at least of one or more of:
   how to map the message to the at least one functionality for time-sensitive communication that is to be used when transporting the message over the Ethernet network (this is where, e.g., an adaptation of a threshold value is likely to reside); and
   how to encode, in the at least one of said one or more Ethernet frames, the request to transport the message according to the at least one functionality for time-sensitive communication (this is where, e.g., utilization of new functionality is likely to reside).

The transfer of configuration information from a server to the enabler component may be organized in any suitable manner.

For example, the enabler component may send a configuration pull request to an enabler server in an Industry 4.0 engineering tool, and receive the configuration in a pull reply. This is particularly useful when the need to obtain a new configuration arises on the side of the enabler component, such as when the end device with the enabler component is commissioned.

Alternatively or in combination, the enabler server may send the configuration to the enabler component in a push request, and the enabler component may confirm the updating of the configuration by means of a configuration push reply. This is particularly useful when the need to update the configuration arises on the side of a centralized management, e.g., when deemed necessary by an operator.

Specifically, the enabler component may unify TSN invocation for all high-level protocols. This has the following advantages:
   The TSN configuration flow is decoupled from the application configuration flow. Independently of the application, a seamless TSN configuration of the end device is enabled.
   A unified TSN configuration entry point is provided for a system builder. The system data flow configuration is enabled in an application-independent manner.
   TSN configuration items are abstracted from high-level applications, so that applications will not need an application programming interface, API, to invoke the TSN features on their own.
   The TSN API is abstracted from the embedded operating system. In this manner, the high-level application will not need to communicate with the (frequently proprietary) embedded system interface.

The enabler server may come in the form of a plug-in module (e.g., a library) that may, e.g., be integrated into an existing engineering tool. In particular, it may provide the following functionality:
   Receive the TSN configuration items for end devices from, e.g., an engineering tool, a CUC ora CNC;
   cross-validate the configuration items with the plant-wide TSN configuration (e.g., TSN bridges) via CUC/CNC if necessary;
   send the configuration items to the end devices; and
   trigger their deployment.

It should be noted that the enabler server is neither a network scheduler is neither a pure configuration validator nor a network scheduler. Rather, it is a plug-in module to deploy TSN configuration on end devices.

The enabler component may specifically receive the configuration items from the enabler server and use them to enable TSN on the end device, e.g., by:
   invoking a legacy network interface from an operating system; or wrapping the provided interface (in the case of a proprietary format) to represent a legacy one;
   configure an IEEE 802.1AS clock; and
   configure a scheduler for a time-triggered communication.

The method may be wholly or partially computer-implemented. In this respect, hardware platforms of end devices, as well as network devices, are to be regarded as "computers" in a broad sense as well because these devices are able to execute at least the computer program code in their firmware. The invention therefore also provides one or more computer programs with instructions that, when executed by one or more computers, cause the one or more computers to perform the method described above.

This computer program may be sold on a non-transitory computer storage medium or as a download product that may be transmitted over a network after purchase. The invention therefore also relates to a non-transitory computer storage medium or a download product with the computer program. The invention also relates to one or more computers with the one or more computer programs, and/or with the non-transitory storage medium or download product.

LIST OF REFERENCE SIGNS 1 end device 1
10 hardware platform of end device 1
11 enabler component of end device 1
12 control application of end device 1
12a-12c modules of control application 12

13a-13c virtual interfaces, provided by enabler component 11
14 real-time clock of hardware platform 1
15 operating system kernel of end device 1
2 industrial plant
3 Ethernet network in industrial plant 2
3* functionality for time-sensitive communication in network 3
3** request to use functionality 3*
31 network device of Ethernet network 3
32 configuration server in Ethernet network 3
4 message
5 Ethernet frames
6 rule in enabler module 11
6a condition in rule 6
7 configuration information for enabler module 11
100 method
105 obtaining configuration information 7 from server 32
110 obtaining message from control application 12
111 providing virtual interfaces 13a-13c to control application 12
120 mapping message 4 to to-be-used functionality 3*
121 performing mapping based on used virtual interface 13a-13c
122 determining whether condition 6a of rule 6 met
123 determining functionality 3* according to matched rule 6
130 converting message 4 into Ethernet frames 5
140 encoding request 3** for functionality 3* into Ethernet frames 5
150 transmitting Ethernet frames 5 to Ethernet network 3
151 synchronizing system time of enabler module 11
152 transmitting Ethernet frames 5 according to schedule
160 decoding request 3** by network device 31
170 forwarding message 4 by network device 31
ttime All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for transporting a message from an end device in an industrial plant over an Ethernet network with extended functionality for time-sensitive communication, comprising the steps of:
    obtaining, by an enabler component of the end device, the message from a control application of the end device comprising providing, by the enabler component, to the control application, a plurality of virtual interfaces that are configured to receive the message from the control application;
    mapping, by the enabler component, based at least in part on the content of the message, and/or on a path through which the message is delivered to the enabler component, the message to at least one functionality for time-sensitive communication that is to be used when transporting the message over the Ethernet network based at least in part on the virtual interface that has received the message, wherein at least one virtual interface is: a virtual Ethernet interface, a UNIX socket, a UNIX named pipe, a FIFO, a UNIX character device, or a UNIX block device;
    converting, by the enabler component, the message into one or more Ethernet frames;
    encoding, by the enabler component, in at least one of said one or more Ethernet frames, a request to transport the message according to at least one functionality for time-sensitive communication;
    transmitting, by the enabler component, the one or more Ethernet frames onto the Ethernet network; decoding, by at least one network device of the Ethernet network, the request; and
    forwarding, by the at least one network device, the message on the Ethernet network according to the requested functionality for time-sensitive communication,
        wherein the control application comprises a plurality of communication modules, and
        wherein the enabler component provides a separate virtual interface of the plurality of virtual interfaces to each communication module.

2. The method of claim 1, wherein the functionality for time-sensitive communication specifically is Time-Sensitive Networking, TSN, functionality.

3. The method of claim 1, wherein the request is encoded in a priority class, and/or in a stream identification parameter, of at least one Ethernet frame.

4. The method of claim 1, wherein the mapping of the message to the at least one functionality for time-sensitive communication based on the content of the message specifically comprises:
  determining, for at least one rule in a predetermined set of rules in the enabler component, whether the content of the message meets a condition required by the at least one rule; and
  in response to determining that the condition is met, determining a functionality for time-sensitive communication specified by this rule as a functionality for time-sensitive communication that is to be used when transporting the message over the Ethernet network.

5. The method of claim 4, wherein at least one condition required by at least one rule specifically comprises:
  the end device indicates, using the message, that it is in an abnormal state or that a physical action performed by the end device on an industrial process executed by the industrial plant has failed; and/or
  a measurement value of a physical quantity that is comprised in the message falls above or below a predetermined threshold value set in the at least one rule.

6. The method of claim 1, further comprising: synchronizing a system time of the enabler component with the Ethernet network.

7. The method of claim 6, further comprising: transmitting the one or more Ethernet frames according to a schedule received by the enabler component from the at least one network device.

8. The method of claim 1, wherein at least one end device specifically comprises:
  a sensor that is configured to measure at least one physical property that is relevant for an industrial process executed by the industrial plant;
  an actuator that is configured to perform a physical action on said industrial process; and/or
  a controller that is configured to drive one or more actuators and receive measurement values from at least one sensor, so as to cause at least one quantity indicated by the measurement values to move to, and/or to remain at, a predetermined setpoint value.

9. The method of claim 1, further comprising: receiving, by the enabler component, configuration information from at least one server, wherein this configuration information is indicative at least of one or more of:
  how to map the message to the at least one functionality for time-sensitive communication that is to be used when transporting the message over the Ethernet network; and
  how to encode, in the at least one of said one or more Ethernet frames, the request to transport the message according to the at least one functionality for time-sensitive communication.

10. The method of claim 1, wherein at least one enabler component specifically comprises a software component running on the same hardware platform as the control application of the end device.

11. The method of claim 1, wherein the at least one functionality is at least one functionality of the Ethernet network of the end device, wherein the enabler component is aware of the at least one functionality, and wherein mapping, by the enabler component, the message to at least one functionality for the time-sensitive communication further comprises selecting, by the enabler component, the at least one functionality.

* * * * *